US010782973B2

(12) United States Patent
Bertolli et al.

(10) Patent No.: US 10,782,973 B2
(45) Date of Patent: Sep. 22, 2020

(54) OPTIMIZING BRANCH RE-WIRING IN A SOFTWARE INSTRUCTION CACHE

(71) Applicant: International Business Machines Corporation, Armonk, NY (US)

(72) Inventors: Carlo Bertolli, Dobbs Ferry, NY (US); John Kevin Patrick O'Brien, South Salem, NY (US); Alexandre E Eichenberger, Chappaqua, NY (US); Zehra Noman Sura, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 272 days.

(21) Appl. No.: 14/712,253

(22) Filed: May 14, 2015

(65) Prior Publication Data

US 2016/0335087 A1 Nov. 17, 2016

(51) Int. Cl.
*G06F 9/38* (2018.01)
*G06F 12/00* (2006.01)
*G06F 12/0875* (2016.01)

(52) U.S. Cl.
CPC .......... *G06F 9/3802* (2013.01); *G06F 12/00* (2013.01)

(58) Field of Classification Search
CPC ..... G06F 9/30058; G06F 9/30145; G06F 9/35
USPC ......... 712/205, 206, 242, 233, 237; 717/151
See application file for complete search history.

(56) References Cited

U.S. PATENT DOCUMENTS

| 6,035,392 | A | 3/2000 | Liptay et al. | |
|---|---|---|---|---|
| 2011/0320786 | A1* | 12/2011 | Chen | G06F 9/3806 712/233 |
| 2013/0262830 | A1 | 3/2013 | Gschwind | |
| 2013/0262829 | A1 | 10/2013 | Gschwind | |
| 2016/0026469 | A1* | 1/2016 | Lin | G06F 12/0862 712/234 |

OTHER PUBLICATIONS

Miller et al., Software-based Instruction Caching for Embedded Processors, ACM SIGARCH Computer Architecture News—Proceedings of the 2006 ASPLOS Conference, vol. 34 Issue 5, Dec. 2006 pp. 293-302.
Gang-Ryung et al., Effectively Exploiting Indirect Jumps, Software—Practice and Experience Softw. Pract. Exper., 29(12), 1061-1101 (1999).
IBM, Configurable Microprocessor Branch Prediction for Performance and Power Savings, IPCOM000028112D IP.com Electronic Publication: Apr. 26, 2004, pp. 2-5.
IBM, Speculative Execution Beyond Branch with Outstanding Branch Target, IPCOM000108329D, May 1, 1992, pp. 2-3.
(Continued)

*Primary Examiner* — Aimee Li
*Assistant Examiner* — Shawn Doman
(74) *Attorney, Agent, or Firm* — Cantor Colburn LLP; Kevin Michael Jordan

(57) ABSTRACT

A method includes a computer device receiving a branch instruction; the computer device managing two tables, where a first table relates to application blocks and a second table relates to available address slots; and the computer device calculating a target of the branch instruction using a branch-to-link register, the computer device optimizes re-wiring in a cache using the calculation and the managed two tables.

1 Claim, 6 Drawing Sheets

(56) References Cited

OTHER PUBLICATIONS

Anonymously, Method and System for Non-branch History Based Prediction Mechanism for Predicting Target Address or a Multiple-Target Branch Instruction, IPCOM000196682D, IP.com Electronic Publication: Jun. 11, 2010, pp. 2-3.

* cited by examiner

OPTIMIZING BRANCH RE-WIRING IN A SOFTWARE INSTRUCTION CACHE

STATEMENT REGARDING FEDERALLY SPONSORED RESEARCH OR DEVELOPMENT

This invention was made with Government support under contract number B599858 awarded by Department of Energy. The Government has certain rights to this invention.

BACKGROUND

The present invention relates to branch re-wiring in software instruction cache, and more specifically, to optimizing the branch re-wiring using a branch-to-link register.

The current implementation of software and hardware based instruction caches requires cumbersome table and/or code editing when the target of a branch is not allocated in cache and a miss inures. The cost of handling an instruction block miss includes, the unavoidable cost of loading the instructions into cache (e.g. finding memory addresses of code, modifying tables, editing branches). When a block is loaded into cache, all branches in other resident blocks pointing to that block may be edited from pointing to the miss handler code to the actual target.

Under specific architectural constraints, typically found in accelerators, the cost of branch editing is high and it is applied only to branches that are actually visited. As a result, a non-edited branch, pointing to an allocated block, is treated as a miss and a large un-necessary overhead is paid. The alternative of editing all branches pointing to a block when it is loaded, is not a viable one due to the large overhead and the miss handler code size required. Still further, re-wiring is an expensive operation that loads an entire instruction in cache when the target block is resident. Re-wiring may only be applied to actually taken branches. Every time a non-rewired branch is taken, a cost comparable to a miss occurs.

SUMMARY

According to one aspect of the present invention, a method includes a computing device receiving a branch instruction; the computer device managing two tables, where a first table relates to application blocks and a second table relates to available address slots; and the computer device calculating a target of the branch instruction using a branch-to-link register, wherein the computer device optimizes re-wiring in a cache using the calculation and the managed two tables.

According to another aspect of the present invention, a system includes one or more processors, one or more computer-readable memories and one or more computer-readable, tangible storage devices; a first module operatively coupled to at least one of the one or more storage devices for execution by at least one of the one or more processors via at least one of the one or more memories, configured to cause a computer device receiving a branch instruction; a second module operatively coupled to at least one of the one or more storage devices for execution by at least one of the one or more processors via at least one of the one or more memories, configured to cause the computer device to manage two tables, where a first table relates to application blocks and a second table relates to available address slots; and a third module operatively coupled to at least one of the one or more storage devices for execution by at least one of the one or more processors via at least one of the one or more memories, configured to cause the computer device to calculate a target of the branch instruction using a branch-to-link register, wherein the computer device optimizes re-wiring in a cache using the calculation and the managed two tables.

According to yet another aspect of the present invention, a computer includes one or more computer-readable storage medium, wherein the computer readable storage medium is not a transitory signal per se; program instructions, stored on at least one of the one or more storage medium, to cause a computer device to receive a branch instruction; program instructions, stored on at least one of the one or more storage medium, to cause the computer device to manage two tables, where a first table relates to application blocks and a second table relates to available address slots program instructions, stored on at least one of the one or more storage medium, to cause the computer device to calculate a target of the branch instruction using a branch-to-link register, wherein the computer device optimizes re-wiring in a cache using the calculation and the managed two tables.

BRIEF DESCRIPTION OF THE OF THE DRAWINGS

DETAILED DESCRIPTION

Figure 1:
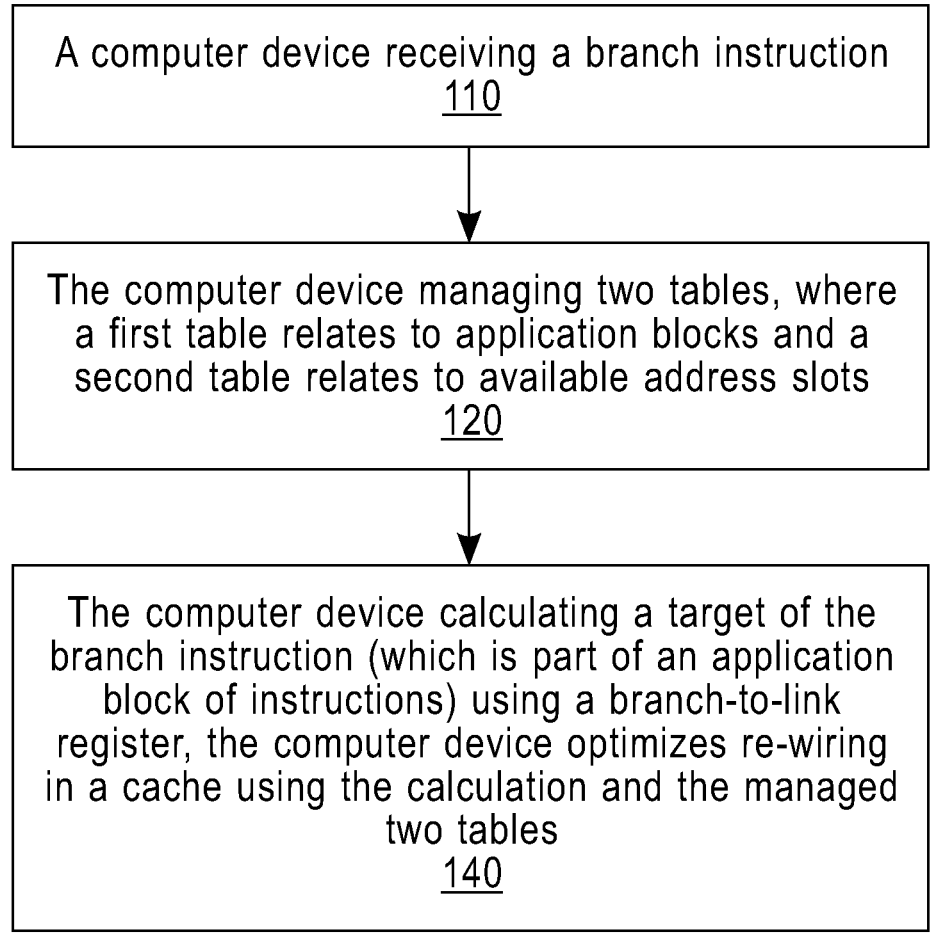
FIG. 1 shows a flowchart according to an embodiment of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. As will be appreciated by one skilled in the art, aspects of the present invention may be embodied as a system, method or computer program product.

An embodiment of the present invention is to transform all branches into branches with a calculated address. For a branch, in case of a hit, the calculated address results in the lane instruction buffer (LIB) address onto which the branch was originally intended to jump. In case of miss, the calculation results in the address of the miss handler. The calculation of the address proposed in this invention is performed in an instruction and performance is done in an efficient way, by handling a memory or register area dedicated to the target calculation. Editing such an area is less expensive, in general terms, than editing the corresponding branch instructions. The size of the area, and thus the cost of target calculations in the miss handler, depends on the number of branches that can be found, in average, in the instruction blocks.

To permit the calculation of branch targets, an embodiment of the present invention dynamically manages two tables: one is associated to application blocks; the other is a subset of the previous one and is associated to the instruction slots available in cache. The tables hold information related to the branches contained in each block, including the address (e.g. cache slot number and offset) and its presence in cache. Coding of presence/absence of a block is done in such a way that calculation of a branch target address is: in case of absence of target, the calculated address is the miss handler; in case of presence, the actual address in cache. Assuming that each block has limited connectivity with other blocks (e.g. less or equal than 3) and assuming to use large block sizes (e.g. 64 or more instructions), the table related to slots may be stored into vector or scalar registers to permit fast access.

Now referring to FIG. 1, shown is a process according to an embodiment of the present invention, which has a computer device receiving a branch instruction (110). The computer device manages two tables, where a first table relates to application blocks and a second table relates to available address slots (120). The computer device calculates a target of the branch instruction (which is part of an application block of instructions) using a branch-to-link register and optimizes re-wiring in a cache by using the calculation and the managed two tables (140). In other words, calculate the target of the branch using the two tables (may result in miss handler address or actual target), store the results of the calculation, and use branch to link register to perform the jump into the calculated target. As mentioned above, the tables hold information related to the branches contained in each block, including the address of each block. Additional information about the blocks will be described hereafter.

Figure 2:
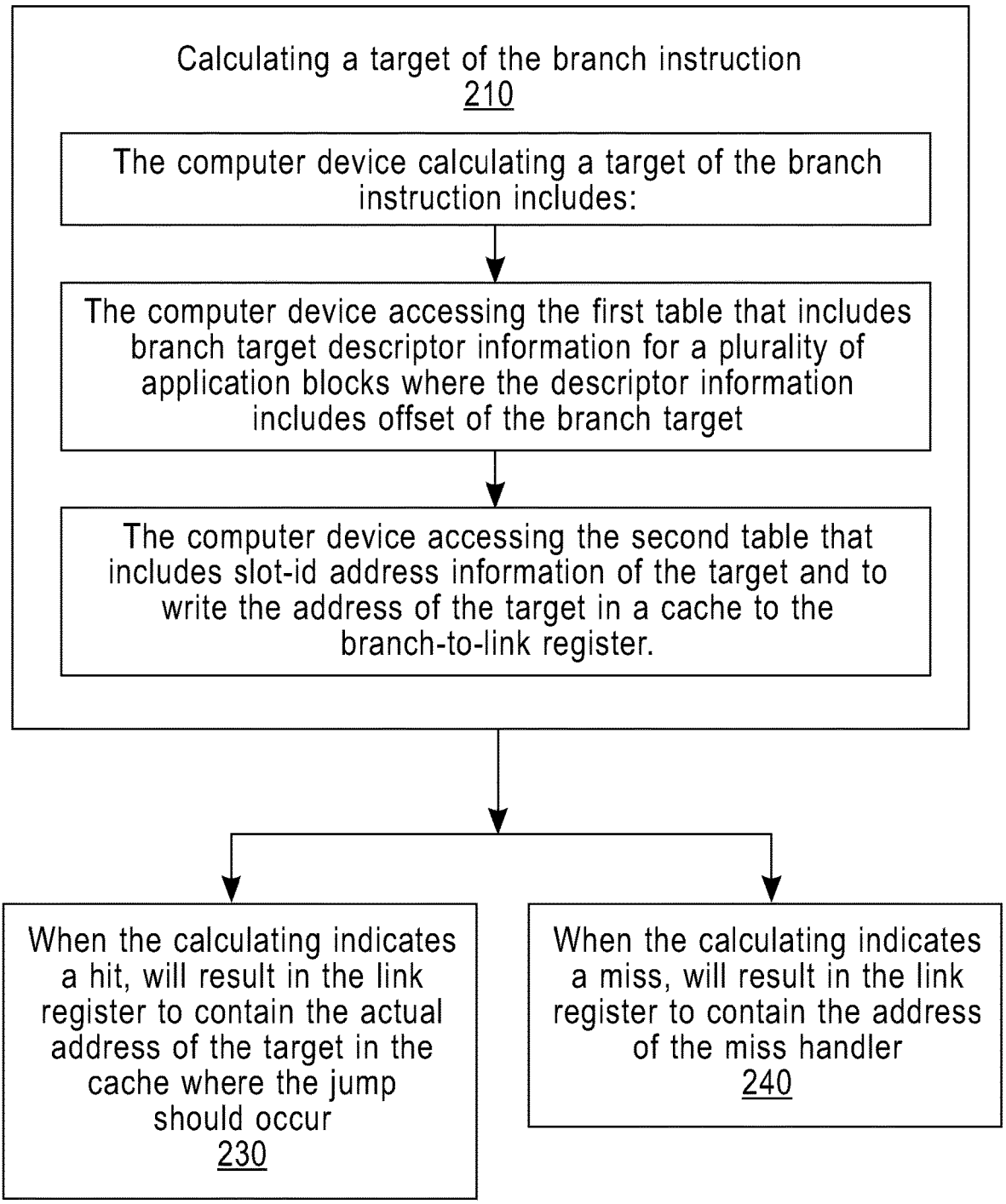
FIG. 2 shows another flowchart according to an embodiment of the present invention.

Referring to FIG. 2, shown is a process according to an embodiment of the present invention, which details the calculating of a target of the branch instruction (210). The calculating of a target of the branch instruction (210) includes: the computer device accessing the first table that includes branch target descriptor information for a plurality of application blocks where the descriptor information includes the offset of the branch target, and accessing the second table that includes the slot identification (slot-id) address information of the target. The computer device writes the address of the target in a cache to the branch-to-link register. When the calculating indicates a hit, the link register will contain the actual address of the target in the cache where the jump should occur (230). When the calculating indicates a miss, the link register will contain the address of the miss handler (240).

Figure 3:
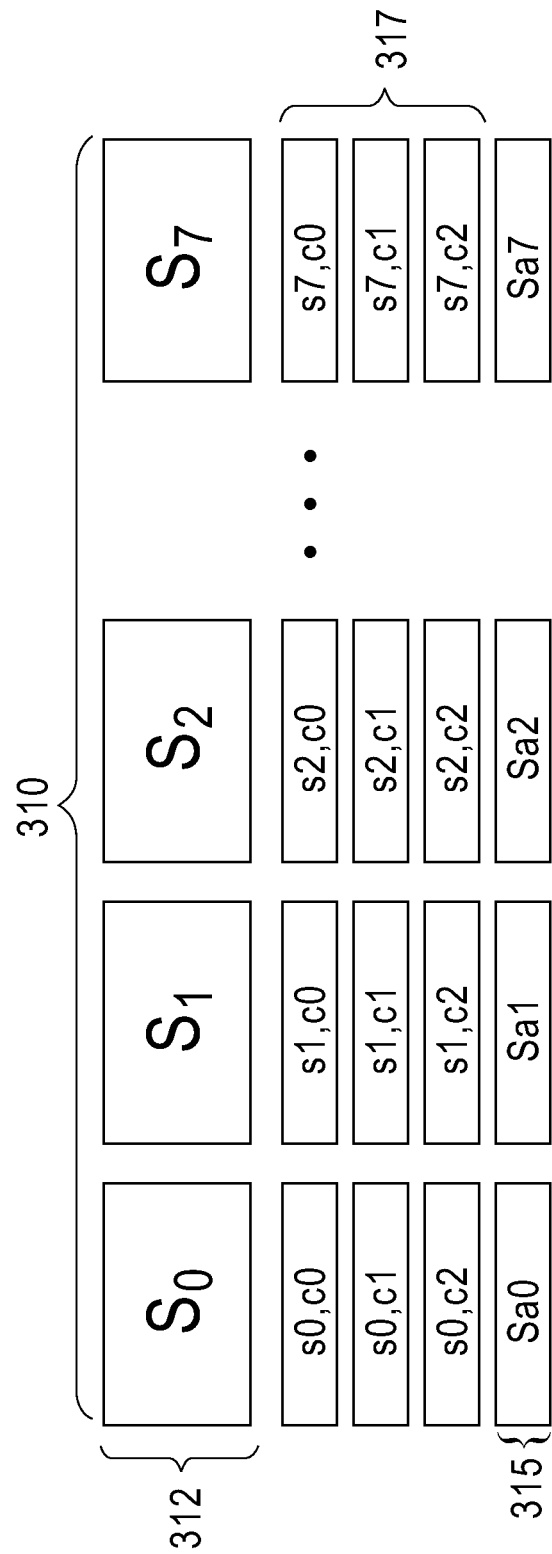
FIG. 3 shows an exemplary implementation according to an embodiment of the present invention.

Referring to FIG. 3 shown is an exemplary implementation according to an embodiment of the present invention. A plurality of blocks 312 in a cache 310 includes a number of slots, for example 8 slots. Each block 312 has a descriptor of its connections or connectivity in memory. In the example exemplary implementation, each block has a maximum connectivity (C) 317. In this example, the maximum connectivity (C) 317 descriptor in memory is C=3. The descriptors are edited when new lines are installed and/or removed. It is further noted that each block 312 includes an address 315. Further information about how the blocks are mapped and determining the calculation to indicate a miss or a hit will described with reference to FIG. 4 and the following description.

Figure 4:
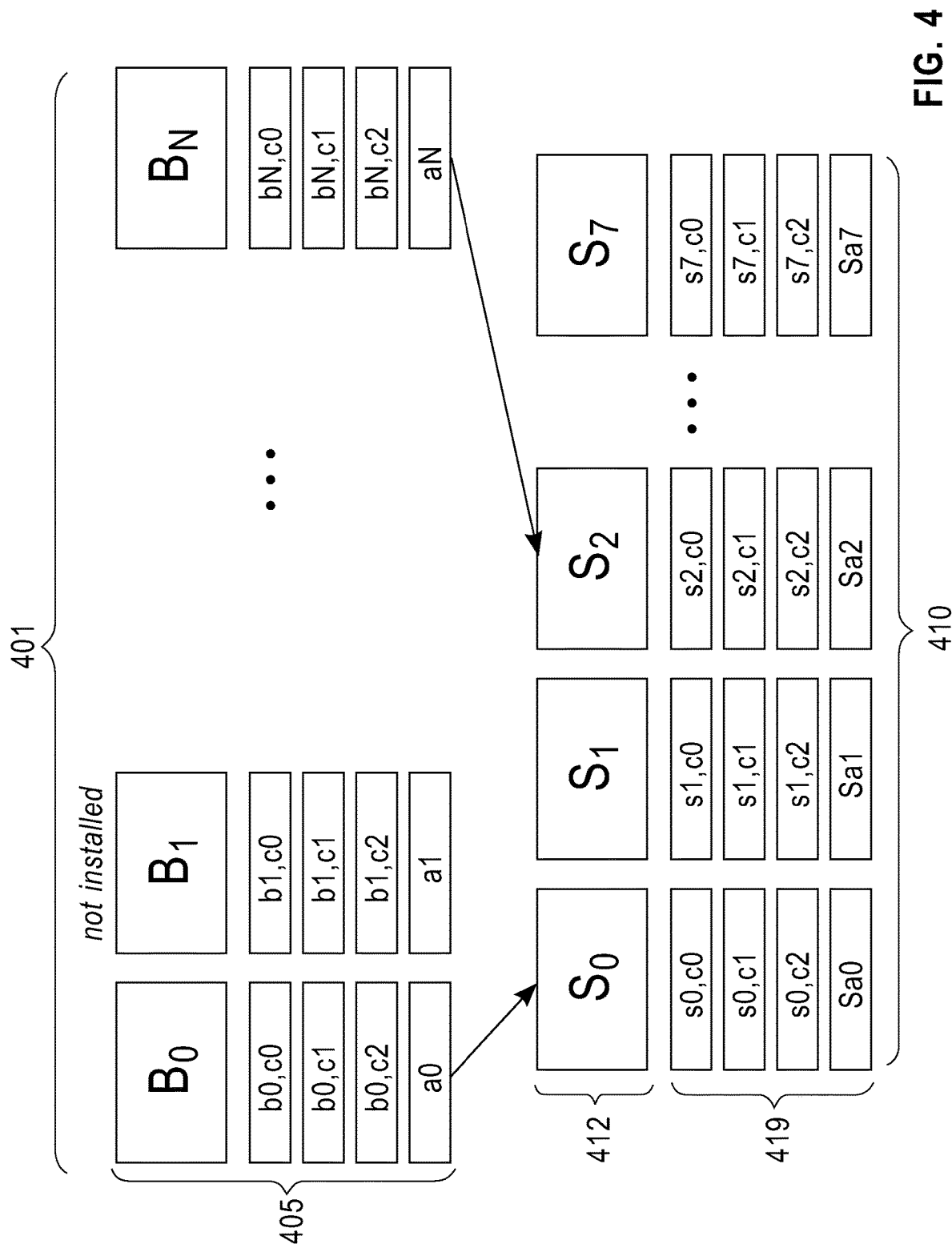
FIG. 4 shows another exemplary implementation according to an embodiment of the present invention.

Referring to FIG. 4 shown is an exemplary implementation according to an embodiment of the present invention. Application blocks 401, as shown by the main memory 405 are mapped into available slots 410. For example application block $B_0$ is mapped into slot $S_0$. Slot $S_0$ contains the instruction memory 412 and the connection descriptors contain the dedicated memory or registers 419. The same is true for application block $B_N$ being mapped into slot S2. The re-wiring (i.e. calculation), branching, Miss handler and the Miss handling cost will be described hereafter.

All branches that originate in a block (also called source block) and target a different block (also called target block) are transformed into a branch-to-link-register instruction. The content of the link register is calculated in the instructions preceding the branch in the following way:

In case the target block is already mapped to the instruction cache when the branch is executed, the link register will contain the address in instruction cache of the branch target (i.e. the address of one of the instructions of the target block in instruction cache (hit case)).

In case the target block is not mapped to instruction cache when the branch is executed, the link register will contain the address in the instruction cache of the first instruction of the block-miss handler procedure (miss case).

The calculation of the target address, stored in the link register, consists in using a bitwise operation between two registers whose contents is:

The content of the connector related to the branch whose target is in calculation stored in the first table (i.e. the table associated to the application blocks); and The content of the connector related to the branch whose target is in calculation (e.g. s0.c0) stored in the second table (i.e. the table associated to the instruction cache slots).

These contents are addresses which contain at least the following information:

The memory address of the target block. This can be used in case the block needs to be loaded from memory to an instruction cache slot;

The offset of the specific instruction targeted by the branch (target instruction) related to this connector inside its own block (the target block); and The instruction-cache slot identifier into which the target block may be loaded. This value is not fixed and can change dynamically.

Some of these fields may be found multiple times in the connector for the purpose of optimizations.

When the target block of a branch is already mapped to the instruction-cache (hit case), the content of the two registers put in bitwise is:

For a connector associated to the block and not to a specific slot (first table), the register contains the actual address of the block in main memory plus the offset of the target instruction in the target block. Both the actual address and the offset information are available at compile-time.

For a connector associated to the slot (second table), the register contains the instruction-cache slot identifier of the target block (hit case).

The bitwise operation, as applied to the above contents, results in a target address having the instruction cache slot identifier of the target block being appended with the offset of the target instruction in that block. The address of the block in memory is also available but is not used by the branch. The first two fields (slot identifier and offset) are stored into the link register and will direct the branch, when taken, to the correct target instruction. To enable fast calculation, the two contents may use neutral operators for the bitwise operation, like a sequence of 1 bits when the information is not known and should be obtained from the other connector.

When the target block of a branch is not mapped to instruction-cache (miss case), the content of the two registers, which are used in the bitwise operation, can consist of the following:

The connector associated to the block, and not to a specific slot (first table), contains the actual address of the block in main memory and the offset of the target instruction in the target block. Both the actual address and the offset information are available at compile-time.

For a connector associated to the slot (second table), the register contains the miss handler instruction-cache slot identifier (e.g. slot number 0) of the target block and all 0 bits in the offset field.

The bitwise operation, as applied to the above contents, results in a target address having the miss handler procedure instruction cache slot identifier and a null offset (all 0s). This is due to the mathematical properties of the bitwise and operation for which the zero value is put in, and with any other value (either 0 or 1), will always result in a 0. In the case of the offset field contained in the connector of the first table, the zero bits contained in the corresponding field of the connector in the second table will result in a zero offset, which corresponds to the first instruction of the miss handler when appended to the miss handler slot identifier.

The additional information that results from the calculation is the address of the target block in memory. This additional information is passed as an input argument to the miss handler procedure.

The miss handler procedure is executed when the target block A of a branch is not mapped to instruction cache. It takes as input the memory address of the block to be loaded. The miss handler procedure performs the following actions:

Select a target instruction cache slot S that currently contains a block B to be evicted from instruction cache. The selection of S can be both static, i.e. decided by the compiler, and dynamic, i.e. decided by the miss handler;

Load the block A into slot S replacing block B using the memory address of block A;

Copy connectors of block A contained in memory (table 1) to the connectors associated to slot S (table 2);

Update all connectors in table 2: connectors of branches that are pointing at an instruction in block B (being evicted) now have to point at the miss handler procedure. The miss handler procedure scans all connector and looks for the slot identifier S. When it finds an occurrence of S in the slot identifier field, it replaces S and the offset with zeros; and Update all connectors in table 2: connectors of branches that are pointing at an instruction in block A (being mapped) now have to point at the right address in A. This is performed by scanning all connectors and checking that the memory address of the target block corresponds to the memory address of A. When an occurrence is found, the slot identifier field contains zero and it is replaced with S and the offset of the target instruction. This information is contained in the link register.

Branching Description

Out of block branching is always a branch-to-link register. The link register content is calculated and results in the following:

Calculation in case of hit will result in the link register to contain the actual address of the target in cache; and Calculation in case of miss will result in the link register to contain the miss handler address.

The calculation puts in "and" two values which are loaded from memory:

One value is the content of the connector (e.g. s0.c0); and

The other is loaded from a constant address in memory (e.g. in constant area) and it contains the branch destination without the slot id information.

Branching to code (hit)
Anatomy of address

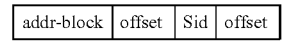

<addr-block> address of block in memory, without offset within block
<offset> offset within block
<Sid> slot identifier that currently holds <addr-block> (if loaded)
  if block is not in cache, the <Sid>=<miss-handler-slot-id> (<Sh>)
Branch from Block Bx using connector Cy (hit)
load branch destination (e.g. from constant area)

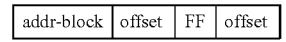

load connector Cy of block Bx (i.e. Bx.Cy)

no offset needed
Put in and the two registers and obtain

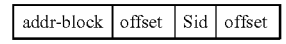

branch <Sid><offset> to the right place
Branching to code (miss)
Anatomy of address

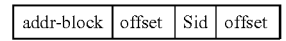

<addr-block> address of block in memory, without offset within block
<offset> offset within block
<Sid> slot identifier that currently holds <addr-block> (if loaded)
  if block is not in cache, the <Sid>=<miss-handler-slot-id> (<Sh>)
Branch from Block Bx using connector Cy (miss)
load branch destination

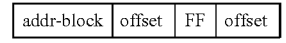

load connector Cy of block Bx (i.e. Bx.Cy) ⟶

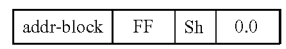

force 0 offset

Put in and the two registers and obtain

| addr-block | offset | Sh | 0..0 | enough to identify the branch
  branch <Sh><0> entry point of the block miss handler
  Cost of calculation of branch target. This is the same for miss and hit cases and it is valid for all out-of-block branches. The cost includes:
    Load of connector in first table from main memory into register A;
    If second table is in main or constant memory, load of connector in the second table from main memory into register B. Otherwise, access register file containing second table for connector;
    Apply bitwise and instruction to registers A and B and obtain C;
    Copy C into link register; and
    Branch to C.
  The total cost when the second table is allocated in main memory is two loads, one is logical instruction, and the other is branch. When the second table is allocated in a register file, the costs are load, logical instruction, and branch.
  Miss Handler
    Load block $B_x$ located at memory address $A_x$
    It replaces block $B_y$ located at memory address $A_y$
    Target slot is $S_t$
    Selection of block to evict can be static or dynamic
    Branch that took us to the handler is (content of LR register):
    Branch <addr-block $A_x$><offset><Sh><0>
    1. Issue LDLIB of block $B_x$ at address $A_x$ into slot $S_t$ ($S_t$ is enough to calculate address in LIB)
    2. Copy connectors of $B_x$ into slot $S_t$ connectors (memory to memory or memory to registers)
    3. Rewire back branches of resident blocks to handler if pointing at evicted block:
    for each block b in [0 . . . B−1] excluding Bx
    for each connector c in [0 . . . C−1] associated with block b
    // exclude evicted block at block address Ay
    if (b.c.addr_block==Ay) then write <Sh><00> in b.c lowest bits
    // include new block at block address Ax
    if (b.c.addr_block==Ax) then write <$S_t$><FF> in b.c. lowest bits
    Rewire branches of installed block to other installed blocks
    for each block b in [0 . . . B−1] excluding Bx
      for each connector c in [0 . . . C−1] associated with block Bx
    // connect block b connector to the new block's connector
    if (b.addr_block==Bx.c.addr_block) then write <$S_b$><FF> in bx.c lowest bit
    The cost of executing the miss handler procedure are the following: Load destination block A from main memory into instruction cache slot S, replacing block B. The address of block A in main memory was stored in register C after branch target calculation. Slot identifier S is sufficient to obtain address in instruction cache (e.g. multiplication by slot size corresponding to a shift left instruction when block size if power of two);
    Load connectors of A from main memory (first table) into connectors associated to slot S (second table). If the second table is allocated into main or constant memory, this is a memory-to-memory operation; otherwise, if the second table is allocated into a register file, this is a memory to register operation;
    For each block allocated in some slot of instruction cache, excluding recently loaded block A, consider all their connectors. For each of such connectors that points at A, write address of A in instruction cache at slot S into that connector. For each such connectors that points at evicted block B, write address of miss handler procedure into connector If the second table is allocated into main or constant memory, this corresponds to a load for each connector, a compare operation, and possibly a store operation. Otherwise, if the second table is allocated into register file, this is only a read register, compare instruction, and possibly write register; and
    For each block excluding recently allocated block A, consider each connector associated to block A. If the current connector points at the current block, write address of the block into instruction cache into connector. If the second table is allocated in main or constant memory, this corresponds to a load from main memory for the block address, a load from main memory of the connector, a comparison instruction, and a store into main memory. The connectors associated to block A may be limited to a small number and thus allocated into register file for this entire operation, removing the need for the second load from main memory. Otherwise, if the second table is allocated into registers, this corresponds to two reads from registers, one comparison, and one write into register.

Miss Handler Cost Example
DMA (LDLIB) of code
Code straight off the binary; no pre/post processing
LDLIB overlaps with handling of connectors
Connector update (Part A)
Read each connectors of all other blocks*: (B−2)*C loads
Compare connector to old block address: (B−2)*C compares
  write if test succeeds (select & unconditional write): (B−2)*C select/write
Compare connector to new block address: same as above
  Can go in parallel because mutually exclusive
This can be fully pipelined:
  (B−2)*C load(1×)→compare(2×)→select(2×)→store (1×)
  can eliminate the "other block" and do it for all blocks to simplify code
* all other blocks with the exception of the miss handler
Connector update (Part B)
Read the block address of other blocks: (B−2) loads
Compare address to each of new block's connector: (B−2)*C compares
  write if test succeeds (select): (B−2)*C select, C stores
this can be fully pipelined:
  (B−2) load(1×)→
  (B−2)*C compare(1×)→select(1×)
  C stores

| Summary | B = 4, C = 3 | B = 8, C = 3 |
|---|---|---|
| DMA: overlapped | | |
| load: (B−2)(C + 1) | 8 | 24 |
| compare, select: (B−2) * 3C | 18 | 54 |

| Summary | B = 4, C = 3 | B = 8, C = 3 |
|---|---|---|
| stores: (B-2) * C + C | 9 | 21 |
| operations fully pipelined | 53 | 153 |

Figure 5:
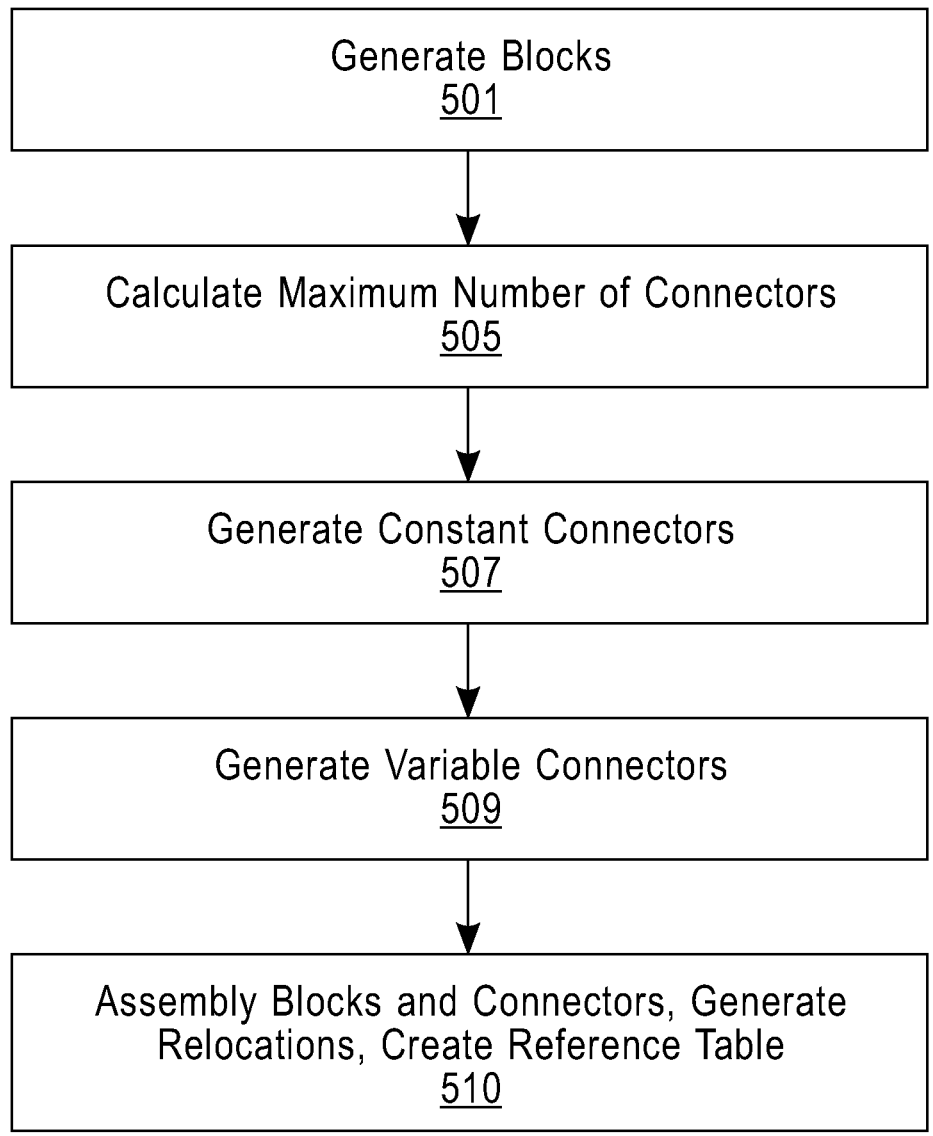
FIG. 5 shows still another flowchart according to an embodiment of the present invention.

Now referring to FIG. 5, shown is another process according to an embodiment of the present invention, addressing the compiler passes for an I-cache support. As discussed with reference to FIGS. 1 and 2 regarding blocks, blocks are generated (501), then the maximum number of connectors are calculated (505). The process continues by generating constant connectors (507) and generating variable connectors (509). The compiler process concludes by assembling the blocks and connectors and generating relocations and a reference table (510).

Figure 6:
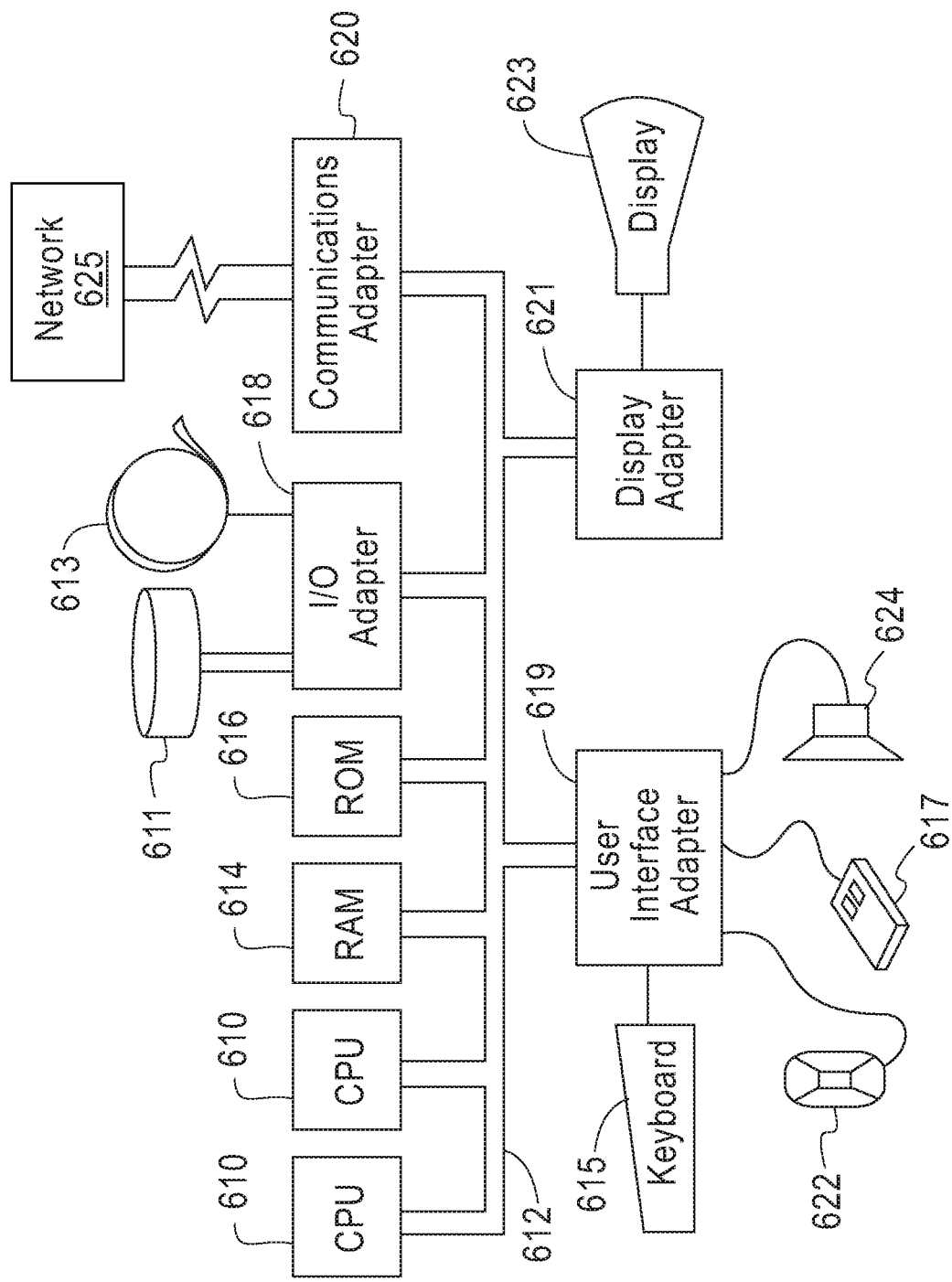
FIG. 6 illustrates a hardware configuration according to an embodiment of the present invention.

Referring now to FIG. 6, this schematic drawing illustrates a hardware configuration of an information handling/computer imaging system in accordance with the embodiments of the invention. The system comprises at least one processor or central processing unit (CPU) 610. The CPUs 610 are interconnected via system bus 612 to various devices such as a random access memory (RAM) 614, read-only memory (ROM) 616, and an input/output (I/O) adapter 618. The I/O adapter 618 can connect to peripheral devices, such as disk units 611 and tape drives 613, or other program storage devices that are readable by the system. The system can read the inventive instructions on the program storage devices and follow these instructions to execute the methodology of the embodiments of the invention. The system further includes a user interface adapter 619 that connects a keyboard 615, mouse 617, speaker 624, microphone 622, and/or other user interface devices such as a touch screen device (not shown) to the bus 612 to gather user input. Additionally, a communication adapter 620 connects the bus 612 to a data processing network 625, and a display adapter 621 connects the bus 612 to a display device 623 which may be embodied as an output device such as a monitor, printer, or transmitter, for example.

Per the embodiments of the present invention, branch rewiring is automatically obtained for all resident branches. They cut down the amount of miss handler execution in codes with high control-flow locality. They required the cost of two memory accesses, one of which can be mapped into registers. The miss handler is a simple table of patching and target block loading. No complex condition checking is required and can be easily vectorized and pipelined. They minimizes the amount of registers needed as compared to previous miss handler implementations. The embodiments of the present invention manage this effectively when blocks have a maximum connectivity C.

The embodiments of the present invention use instruction memory which are divided into B slots, for example: B−1 slots for instructions and one slot for "block miss handler" procedures. The embodiments of the present invention assume that all out-of-block branches use absolute addresses in I-cache memory:
  a. An address is: <block-id><offset> where:
    i. <block-id> indicates in which block the branch target is located;
    ii. <offset> is the offset within the selected block;
  b. The upper bits of the address are ignored by the branch instruction; and
  c. Assure the upper bits are sufficient to fully describe the address space,
    i. if not, use more bits.

If higher connectivity is needed then there will be a need to have staging blocks. If using less and larger blocks does not result in frequent misses, connectors can be held in scalar registers, e.g. partition cache in 4 slots.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a processor of a computer device, a branch instruction of an application block of instructions;
   managing, by the processor, two tables, wherein
      a first table comprises branch target descriptor information for a plurality of application blocks, wherein the descriptor information comprises an offset of a branch target, and
      a second table comprises slot-id address information of the branch target, wherein an address of the branch target in a cache to a branch-to-link register is written; and
   calculating, by the processor, a target of the branch instruction by using the branch-to-link register, wherein calculating the target of the branch instruction comprises:
      determining a cache status of the application block using the first table;
      in response to the cache status indicating that the application block is located in the cache, writing the address of the target of the branch to the branch-to-link register using the slot-id address information of the target of the branch accessed from the second table comprising; and
      in response to the cache status indicating that the application block is not located in the cache, writing an address of a miss handler to the branch-to-link register; and
   jumping to the target of the branch instruction using the brank-to-link register.

* * * * *